United States Patent [19]
Bois

[11] Patent Number: 6,085,491
[45] Date of Patent: Jul. 11, 2000

[54] PROCESS AND APPARATUS FOR MANUFACTURING BAGS

[75] Inventor: Henri Georges Bois, Neuilly sur Seine, France

[73] Assignee: Flexico-France, Henonville, France

[21] Appl. No.: 09/187,282

[22] Filed: Nov. 5, 1998

[30] Foreign Application Priority Data

Nov. 6, 1997 [FR] France .................................. 97 13945

[51] Int. Cl.⁷ .............................. B65B 9/20; B65B 61/18
[52] U.S. Cl. ............................ 53/412; 53/451; 53/133.4; 53/139.2; 53/547; 53/551
[58] Field of Search .......................... 53/412, 451, 133.4, 53/139.2, 547, 551, 567, 570, 576; 493/213, 302, 927; 383/63, 65

[56] References Cited

U.S. PATENT DOCUMENTS

| 3,027,696 | 4/1962 | Leasure | 53/451 |
|---|---|---|---|
| 3,264,794 | 8/1966 | Brown | 53/567 |
| 3,938,300 | 2/1976 | Lovqvist | 53/576 |
| 3,948,019 | 4/1976 | Doring | 53/570 |
| 4,495,751 | 1/1985 | Galbiati | 53/576 |
| 4,510,736 | 4/1985 | Muller | 53/570 |
| 4,620,320 | 10/1986 | Sullivan | 493/213 |
| 5,035,517 | 7/1991 | Edelman | 383/63 |
| 5,275,491 | 1/1994 | Kuge et al. | 383/63 |
| 5,564,259 | 10/1996 | Stolmeier | 53/133.4 |
| 5,788,378 | 8/1998 | Thomas | 383/63 |

FOREIGN PATENT DOCUMENTS

WO 98/13271  4/1998  WIPO .

*Primary Examiner*—John Sipos
*Attorney, Agent, or Firm*—Pitney, Hardin, Kipp and Szuch LLP

[57] ABSTRACT

A tube of plastic material is cut at a bag length interval from a free end to define an open mouth. The free end is sealed to form a bag and a reclosable fastener strip is affixed to the open mouth after the tube is cut. Prior to affixing the reclosable fastener strip, but after the tube section is cut, the bag is moved away from the remainder of the tube. The side edges of the bag adjacent to the open mouth are slit and the slits and reclosable fastener strip are joined after the reclosable fastener strip is positioned in the slits. The bag may be filled after the free end of the tube is sealed but before cutting the bag length interval from the tube.

13 Claims, 6 Drawing Sheets

FIG_1

FIG_2

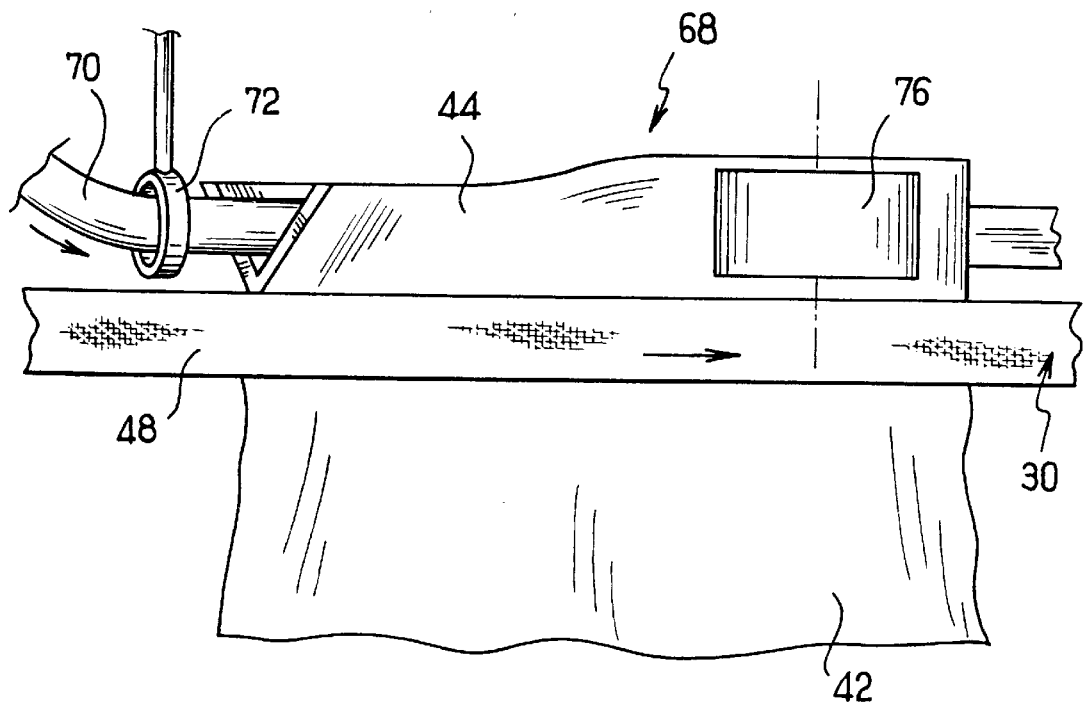
FIG_7
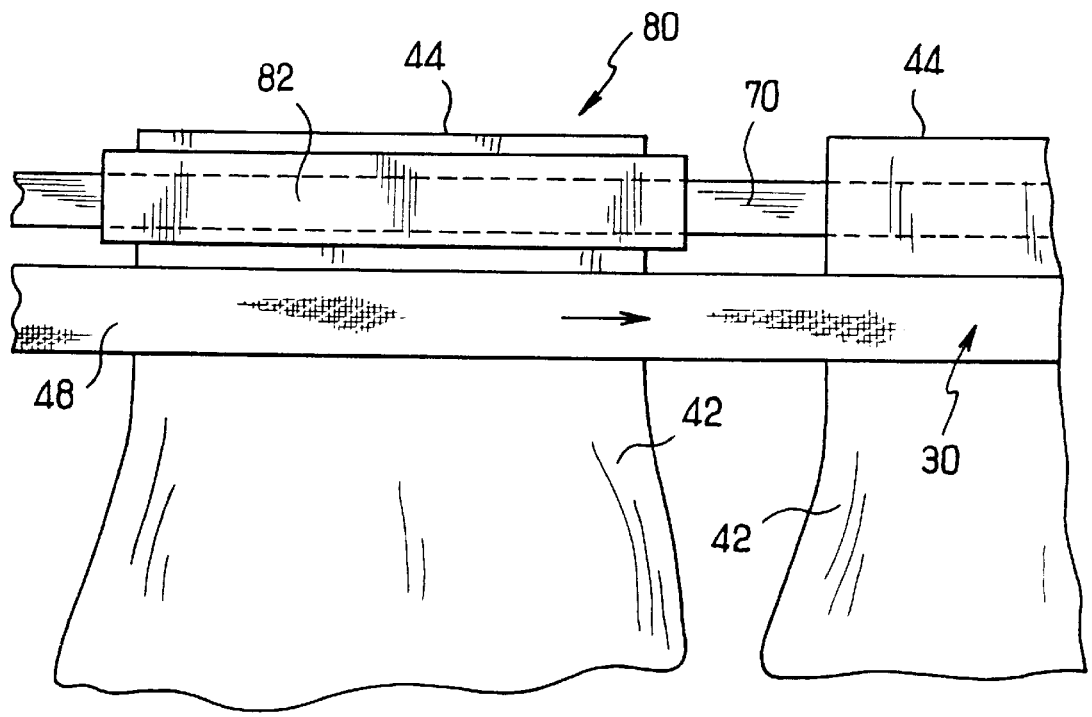
FIG_8

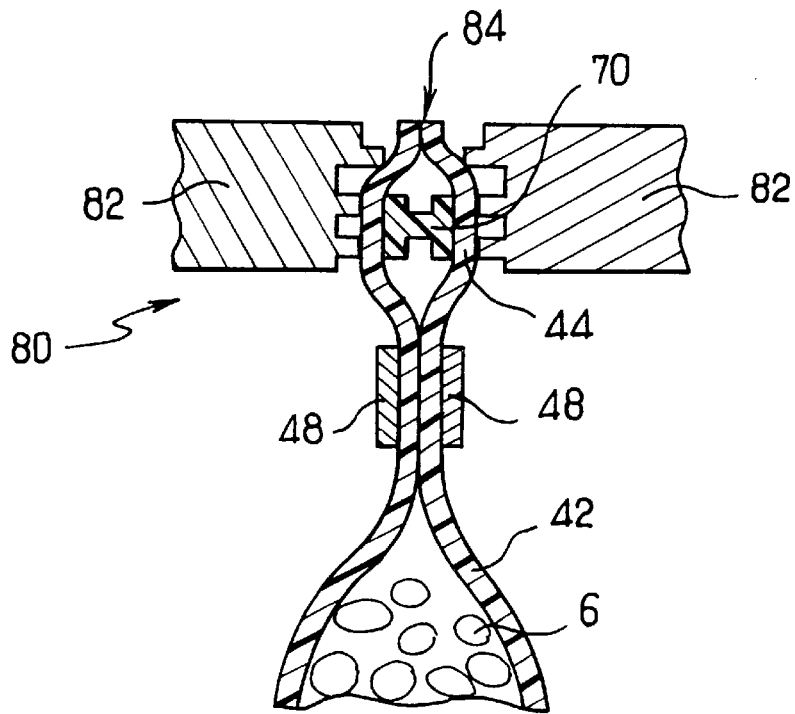
FIG_9
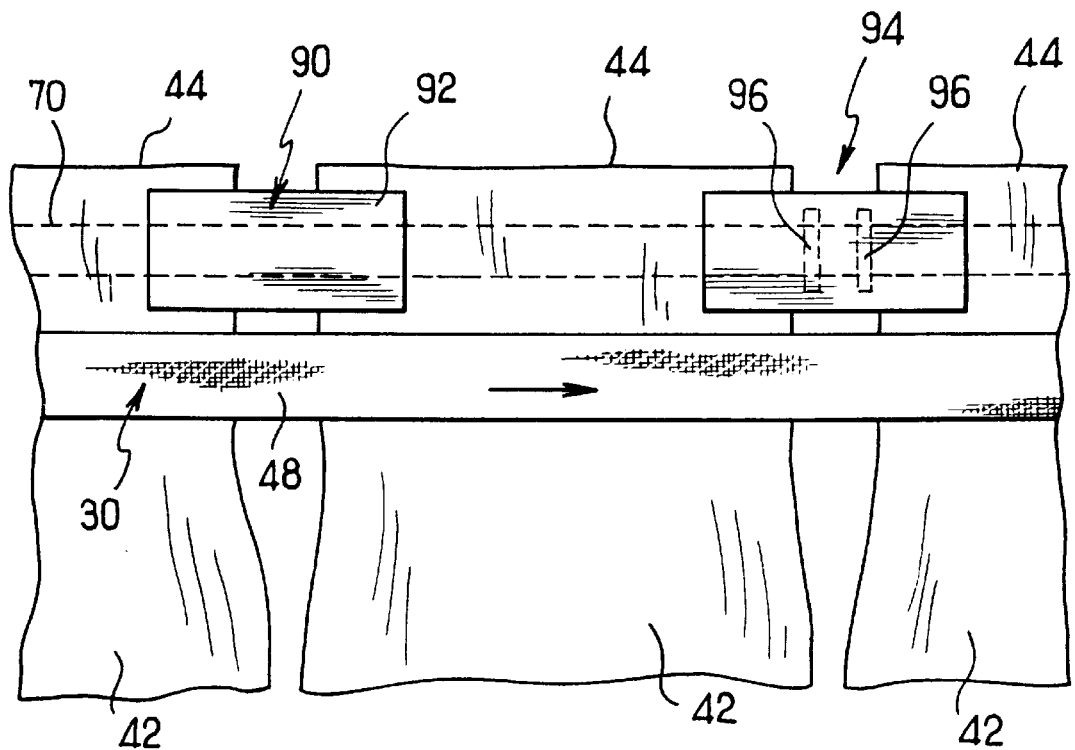
FIG_10

PROCESS AND APPARATUS FOR MANUFACTURING BAGS

BACKGROUND OF THE INVENTION

The invention relates to processes for producing bags and packaging processes for substances.

In U.S. Pat. No. 4,909,017, a device is disclosed for producing bags and packaging, in which a tube is formed continuously around a shaping unit from an initially flat plastic film. A chute for supplying a substance to be packaged opens into the inner portion of the forming unit, which opens into the tube. After the forming unit, a first transverse sealing of the tube onto itself is performed so as to form a seal that provides a closed bottom edge for the bag. Then the substance is released and falls into the bag. Next another seal is made above the content of the bag in order to seal the bag and the tube is cut above this second seal in order to provide a sealed closed mouth for the bag and to separate the bag that has been filled in this manner from the rest of the tube. In practice, the upper sealing of one bag and lower sealing of another bag above the first bag are performed simultaneously, and the cut is made between the two seals. In addition, a reclosable fastener strip is sealed transversely onto the film before the film is folded onto itself to form the tube. This strip is then sealed to the opposite side of the bag and extends into the bag at the closed mouth. The strip can be opened by the user in order to obtain access to the substance.

It turns out to be difficult to make this process compatible with certain special types of reclosable fastener strips, for example so-called tamper-proof fasteners or those which involve gluing.

An object of the present invention is to provide a process of a different kind for the production of bags and packaging.

SUMMARY OF THE INVENTION

In order to achieve this goal, according to the invention, a process for producing bags is provided in which a tube is cut to separate one bag from the rest of the tube, and, in which, after the cutting step, a reclosable fastener strip is mounted on the bag.

Thus the step of placing the strip is not subject to any of the constraints associated with the presence of the tube, formation of the tube, and cutting of the tube. In particular, the range of possibilities relating to positioning the strip on the bag and the time at which it is mounted is broadened significantly.

It is advantageous for cutting to be performed so as to provide an open mouth for the bag, and the strip is mounted on the mouth.

Thus, in contrast to the disclosure of U.S. Pat. No. 4,909,017, the mouth of the bag remains open after the cutting. For certain types of reclosable fastener strips, this facilitates the supplying and mounting of these strips on the bag.

Prior to the cutting stage, it is advantageous for two walls of the tube to be securely joined so as to form a transverse seal on the tube.

Advantageously, after the cutting step and before the strip is mounted, the bag is moved with respect to the tube in a direction of movement that is locally not parallel to the local longitudinal direction of the tube.

Thus, with the steps of cutting the bag and mounting the strip being separated in space, a significant area can be made available for each of them and the problems of encumbering the manufacturing line are simplified. Furthermore, in certain cases, supplying and mounting of the reclosable fastener strip is facilitated even more.

Prior to the mounting of the reclosable fastener strip, it is advantageous for the mouth of the bag to be shaped in a predetermined manner. Thus, mounting of the strip is facilitated.

Prior to the shaping step, it is advantageous for two opposite sides of the mouth to be separated from one another.

Prior to the mounting of the strip, it is advantageous to slit the side edges of the bag next to the mouth.

In this way, insertion of reclosable fastener strip into the mouth is facilitated, especially in the case described below of a single strip common to two bags.

In this way, the holding and positioning of bags with respect to one another as the process is applied is improved.

After the common strip has been attached, the strip is cut to separate the bags.

Advantageously, before the common strip is cut, the side edges next to the mouth are secured to each other and to the strip. Improved sealing of bags along the edges of their mouths when they are closed is obtained as a result.

According to the invention, a process for packaging a substance is also provided that implements the process of producing bags according to the invention.

Advantageously, a substance is placed in a bag before the strip is mounted.

It is advantageous also for a substance to be placed in a bag before the cutting step.

Likewise, according to the invention, a device for producing bags is provided, including a mechanism for supplying a tube and a mechanism for cutting the tube to separate one bag from the rest of the tube. This device also includes a mechanism for placing a reclosable fastener strip on the bag, these mechanisms being arranged so as to attach the strip after the bag as been separated from the tube.

It is advantageous for the device to be designed in such a manner that its cutting mechanism forms an open mouth on the bag, and the mounting mechanism mounts the strip on the open mouth.

It is advantageous for this device to include a mechanism for securing two walls of the tube so as to form a transverse seal on the tube, this mechanism extending upward from the cutting mechanism with respect to the direction in which the tube is being supplied.

It is advantageous for the device to contain at least one support for the bag while it is being cut by the cutting mechanism.

In this way, the precision and speed in cutting are improved.

It is advantageous for the device to contain at least two suitable supports to extend on both sides of the bag while it is being cut by the cutting mechanism.

It is advantageous for the device to contain a transport mechanism to move the bag with respect to the tube to the mounting mechanism.

It is advantageous for the transport mechanism to be arranged so as to move the bag in a direction that is not parallel to the longitudinal direction of the tube.

It is advantageous for the transport mechanism to include a conveyor belt.

It is advantageous for the transport mechanism to include suitable belts on both sides of the bag.

It is advantageous for the belts to be adapted so as to be in contact with the bag while it is being cut by the cutting mechanism and to move so as to permit another bag to arrive at the cutting mechanism. In this way, it is possible for a bag to be removed very quickly after cutting and for the next bag to be moved into the cutting station.

It is advantageous for the device to include a mechanism to separate two opposite sides of the open mouth.

It is advantageous for the device to include a shaping unit for the open mouth.

It is advantageous for the system to include a mechanism for slitting side edges of the bag next to the mouth.

It is advantageous for the mechanism which mounts the reclosable fastener strip to include a mechanism for supplying a continuous strip.

It is advantageous for the system to include a cutting mechanism for the closing strip after the mechanism for mounting this piece in the direction in which the bag is moved by the transport mechanism.

It is advantageous for the device to include a mechanism for securing the side edges of a bag, next to the mouth, to each other and to the strip.

Likewise, according to the invention, a packaging device is provided that includes a mechanism for producing bags according to the invention.

It is advantageous for the device to include a mechanism for placing a substance in a bag before it is placed in the mounting mechanism.

It is advantageous for the device to include a mechanism for placing a substance inside a bag before it is cut by the cutting mechanism.

Other characteristics and advantages of the invention will appear from the following description of a preferred embodiment which is given as a non-limiting example. dr

BRIEF DESCRIPTION OF THE DRAWINGS

In the attached drawings:

FIG. 7 is a partial elevated view of the location in the device of FIG. I where the reclosable fastener strip is mounted.

FIGS. 8 and 9 are respectively elevated and horizontal cross-sectional views showing the location in the device of FIG. I where the strip is welded; and FIG. 10 is an elevated view of the location for sealing edges of the bags and the location for cutting the strip.

DETAILED DESCRIPTION OF THE PREFERRED EMBODIMENT

Figure 1:
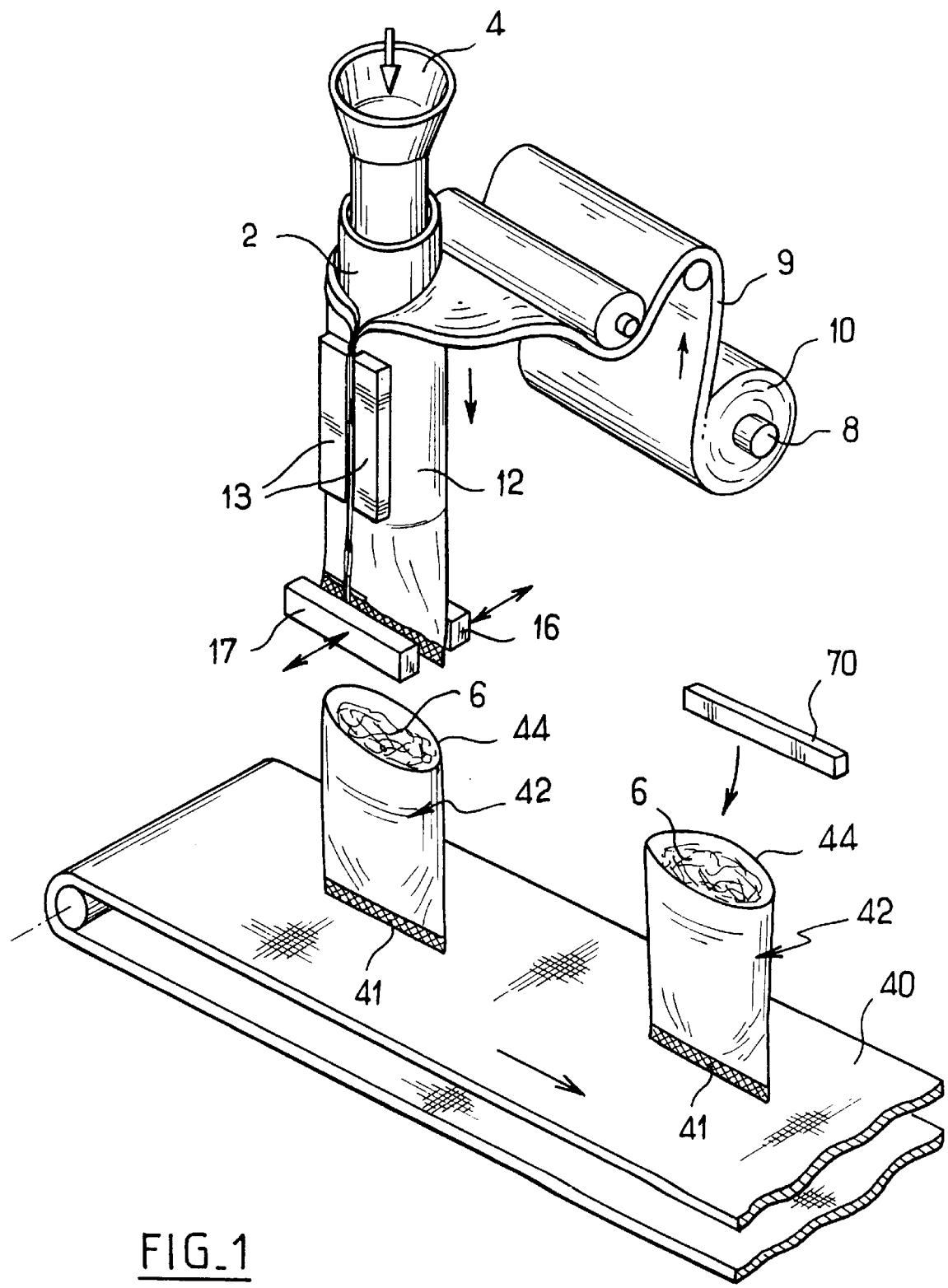
FIG. 1 is a partial perspective view of a device according to the invention, illustrating the production of the tube and the principle of moving the bags.
Figure 2:
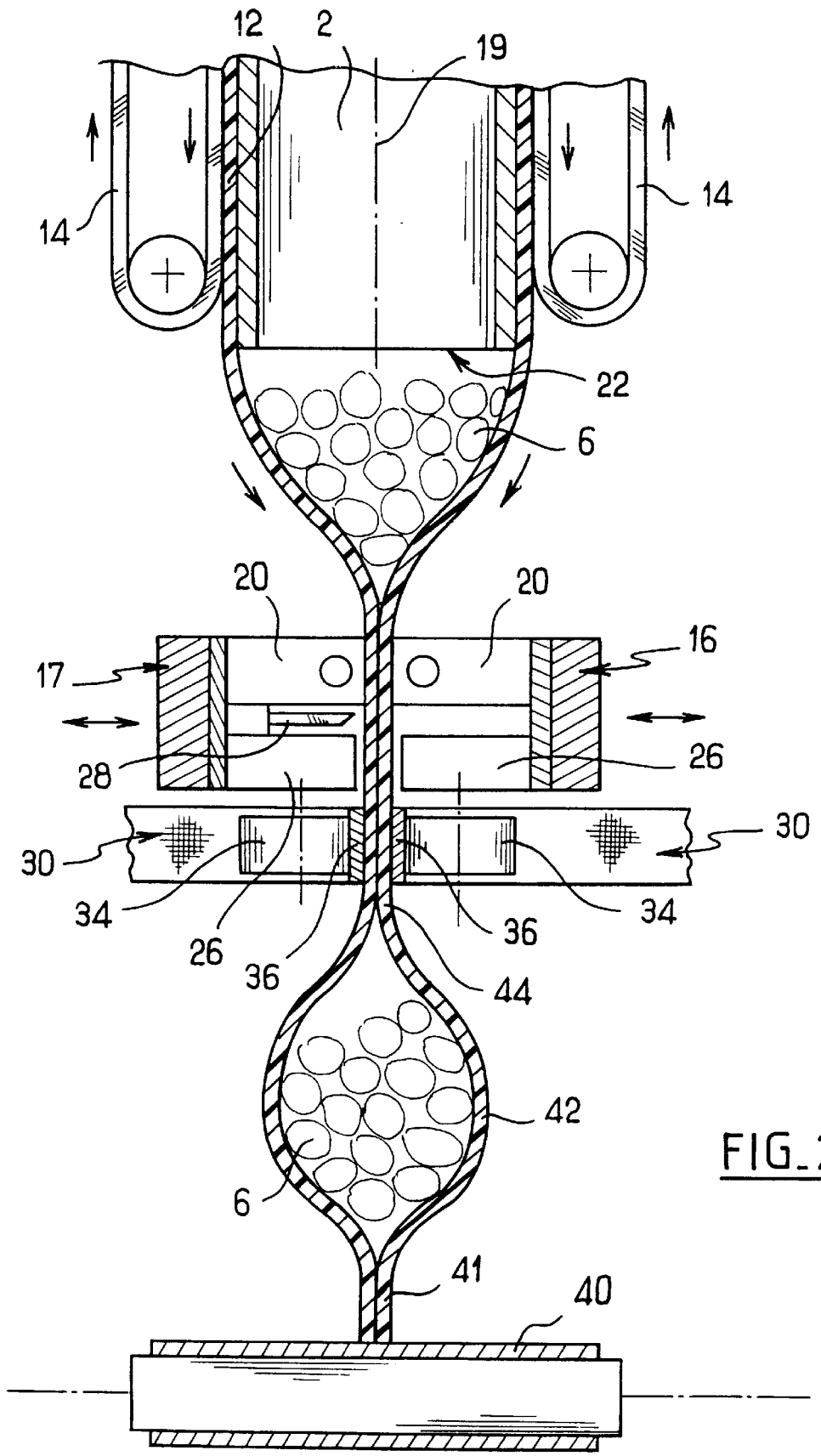
FIG. 2 is a vertical cross-section view of the device of FIG. 1, showing the cutting and sealing mechanisms.

In reference to FIG. 1, the continuous packaging device according to the invention includes, in the present embodiment, a shaping unit that includes a cylindrical tube (2) extending vertically and a neck. A chute (4) for supplying a substance such as a food product (6) penetrates into an open upper end of the tube (2) in order to introduce the substance. The device contains a mechanism (8) for supplying a flat film (9) of a suitable plastic material, by means of a feed roller (10). The device is arranged in a known manner to allow continuous shaping of the film (9) into a tube (12) as the film passes through the shaping unit. In this case, the tube (12) is shaped in the vertical direction from bottom to top. Two opposite longitudinal edges of the film (9) then come into contact with each other along a vertical tube former. The system includes a pair of vertical sealing bars (13) which are arranged so that the two edges travel between them in order to allow continuous sealing. In this way, an endless tube (12) can be produced continuously. Mechanisms are provided for guiding the film (9) and the tube (12), such as the belts (14) that can be seen in FIG. 2. In the following, the directions upstream and downstream refer to the direction in which the tube (12) and then the bags (42) progress, as will be seen. In general, this is the direction in which the plastic material that constitutes the bags moves.

With reference to FIGS. 1 to 4, the device contains two left (16) and right (17) assemblies, with respect to the direction in which the bags are removed, as will be seen below. These two assemblies (16, 17) are movable within a horizontal plane along a radial direction with respect to the vertical axis (19) of the tube (12). These two assemblies extend with respect to one another, diametrically opposite to one another, so as to occupy diametrically opposed positions in relation to one another on either side of the axis (19) of the tube. The assemblies can be shifted simultaneously away from this axis, as in FIG. 3, or pulled toward it, as in FIG. 4. Assemblies 16 and 17 respectively contain two sealing rods (20), which extend opposite and parallel to one another in the same horizontal plane. The two rods (20) extend from an open bottom end (22) of the tube (2) in the vertical direction.

Assemblies 16 and 17 also contain two corresponding supports (26) in the form of rods, each fixed with respect to the associated sealing rod (20). The two supports (26) are positioned in the same manner as the sealing rods (20) below them, parallel to and at a distance from them.

The right assembly (17) also contains a cutter (28) that extends between the associated sealing rod (20) and support (26). The cutter is movable with respect to the sealing rod (20) and support (26) along a radial direction with respect to the axis (19), between a retracted position shown in FIG. 2, in which the cutter is retracted between the associated rod (20) and support (26) without protruding beyond them, and an extended position, in which the cutter protrudes beyond them in the direction of the axis (19) so that the cutter intersects the axis and extends between the rod (20) and the support (26) of the left assembly (16).

The device contains two lower belts (30) for support and transport functions. Each belt (30) moves in a horizontal plane that is generally perpendicular to the axis (19) but is locally parallel to the axis (19). The belts (30) move in such a way that each is supported by stationary rollers (32), as well as by two corresponding pairs of movable rollers (34), which are respectively attached to the accompanying assemblies (16, 17). The stationary rollers (32) and the movable rollers (34) are arranged so that a portion (36) of the belt extending between the associated movable rollers (34) is always situated beneath the associated support (26) and extends parallel to it. When assemblies 16 and 17 move as described, the two movable portions (36) of the belt perform movements identical to those of the assemblies, being simultaneously extended toward or retracted from the axis (19). A tension-adjustment device, not shown, is associated with each belt (30), so that tension of the belt on the rollers is not altered by this movement of the movable portions (36) with respect to the rest of the belt. This device also includes a rolling belt (40) that extends generally in a horizontal plane beneath the shaping unit and the movable portions (36) of the conveyor belt.

In terms of the parts that have just been described, the device functions in the following manner.

Figure 3:
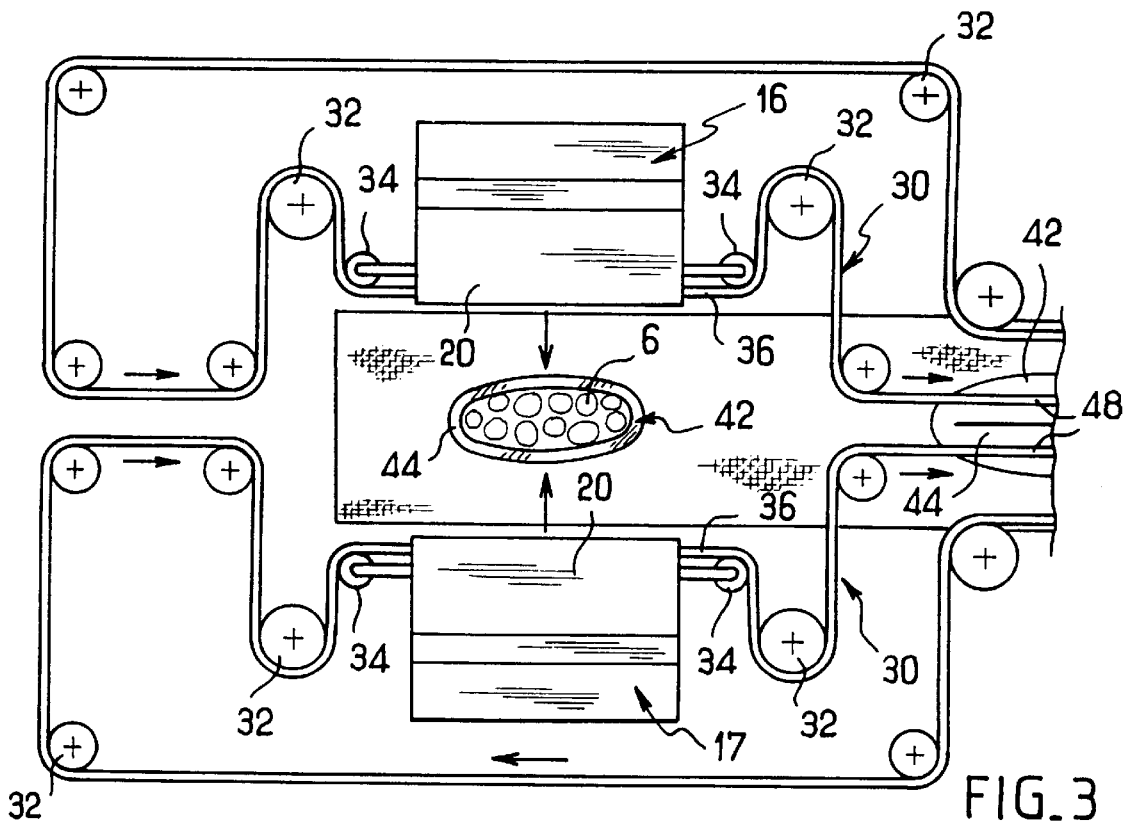
FIGS. 3 and 4 are plane views of the transport mechanism of the device of FIG. 1 near the sealing mechanism with the sealing mechanism being respectively in open and closed positions.
Figure 4:
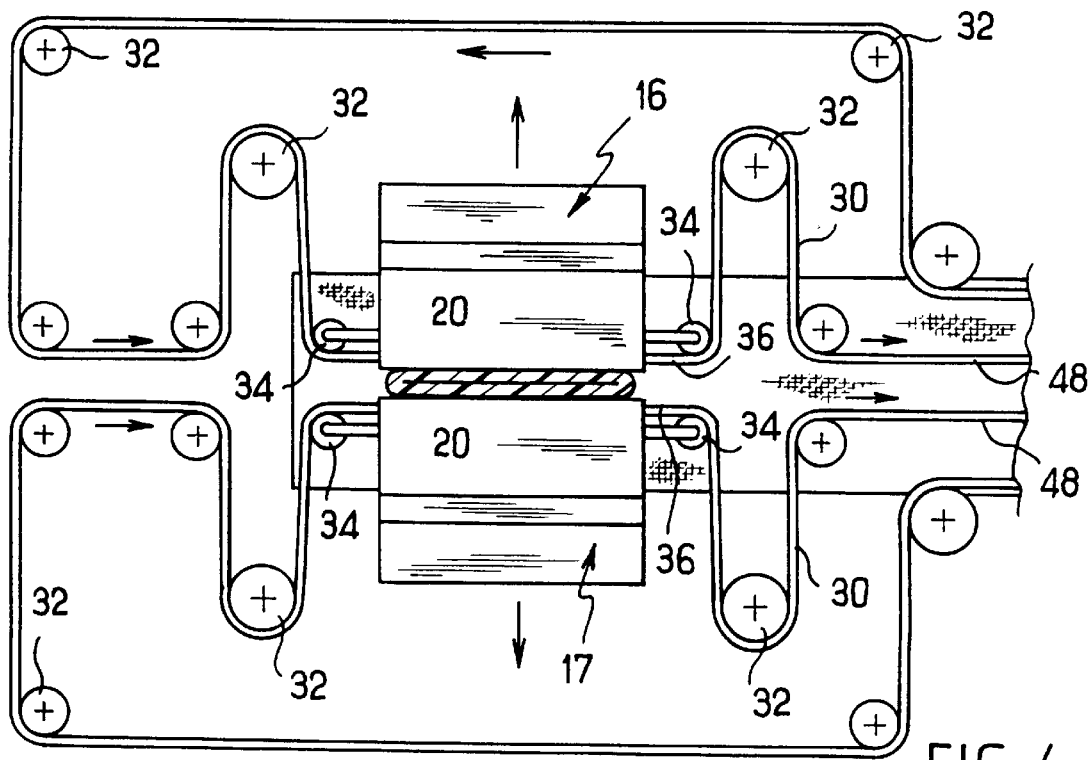

After the bottom end of the shaping unit, the tube (12) is gripped by the sealing rods (20) of the two assemblies (16, 17), which occupy a position close to one another, in order to seal the two walls of the tube (12) to one another, thereby forming a transverse seal (41) on the tube, said seal being perpendicular to the axis (19). At the same time, some of the substance to be packaged is released into chute (4) so that it falls into the tube (12) downstream from the bottom end (22) and upstream from the seal (41) formed in this manner. Subsequently, the two assemblies (16, 17) move away from one another as shown in FIG. 3, so as to allow the portion of the tube (12) which is filled with the substance to pass between them, and the tube is then allowed to descend as it is pulled downward. The seal (41) formed on the tube then comes into contact with the conveyor belt (40). Then the two assemblies (16, 17) move toward one another again, so as to make an identical seal on a part of the tube (12) which is located farther upstream, upstream from the portion of the substance (6) placed inside the bag. During this sealing, the cutter (28), which was initially in the retracted position, moves into the extended position in order to cut the tube (12) near and downstream from the new seal. This cut separates the bag (42) which has been formed downstream of the cutter from the remaining portion of the tube (12), which extends upstream from the cutter. Furthermore, because the bag (42) does not contain any other seals in this case, or any form of closure other than the sealed bottom edge (41) that rests on the conveyor belt, this cut forms an upper mouth (44) for the bag. The mouth (44) is still being gripped, as will be seen. Then the bag (42) formed in this manner is removed along a horizontal direction perpendicular to the axis (19) toward the right, as shown in FIG. 3.

The bag (42) is cut and the bottom (41) seal on the rest of the tube are made at the same time, namely on the portion that will constitute the next bag in an upstream direction, are performed at the same time. During these two operations, performed simultaneously while the two assemblies (16, 17) are in a position close to one another, the tube (12) is gripped and held between the sealing bars (20), as well as between the two portions (36) of the belts that are located downstream from the supports (26). Furthermore, the supports (26) are at a short distance from the tube (12), on both sides of it, with a slight clearance. The supports allow curling or deformation of any portion of the tube to be avoided during these operations.

Removal of the bag (42), once it has been cut, is performed by the conveyor (40) and by the movable portions (36) of the belts, before the assemblies (16, 17) move apart from one another again.

The system includes other stations (50, 68, 80, 90, 94), some of which extend above the conveyor (40) and the others downstream, one after another. For this purpose, the belts (30) contain two straight portions (48) that extend parallel to one another and in opposite directions, above the conveyor and under the various stations. The bag (42) is supported in this way and held by the conveyor and the straight portions of the belts while they are being transported from one of these various stations to another and during processing at each station. In their portion located farther upstream, the straight parts (48) are suitable for gripping one upstream edge of the bag (42) while it is still being held by the movable portions (36) when they are close to one another. In this way, the start of the removal of a bag (42) is provided by the movable portions (36), and it is subsequently taken over by the straight portions (48).

Figure 5:
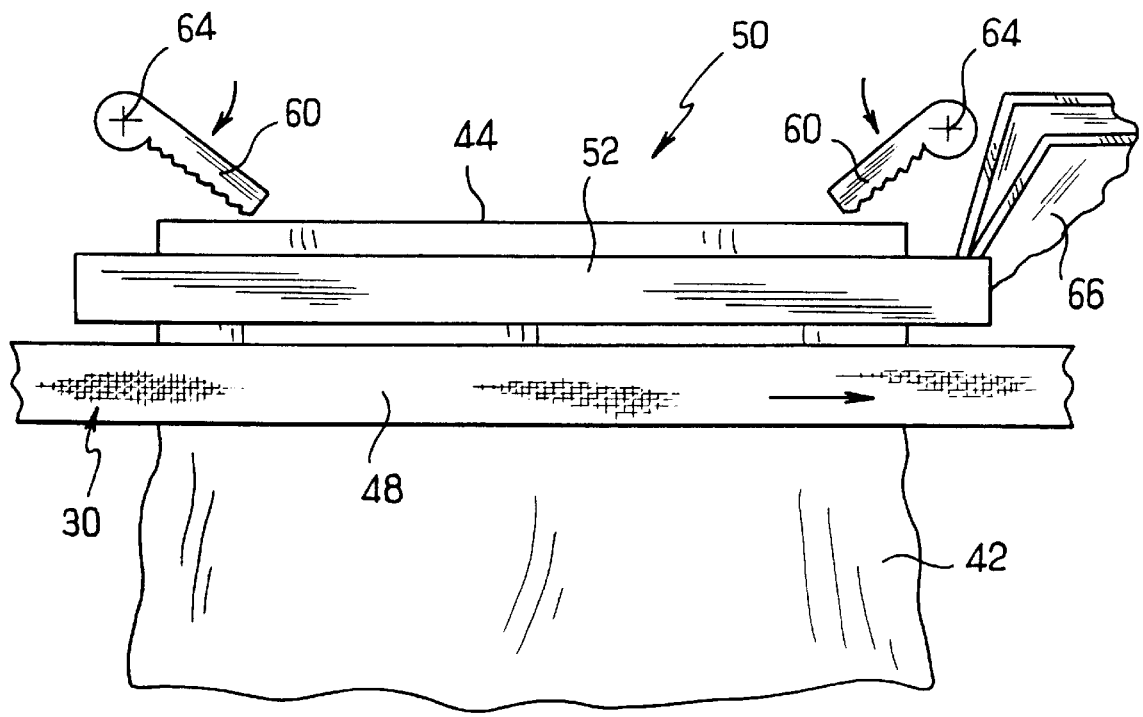
FIGS. 5 and 6 are respectively a partial elevated and a horizontal cross-sectional view of the location in the device of FIG. I where the edges of the mouth are separated.
Figure 6:
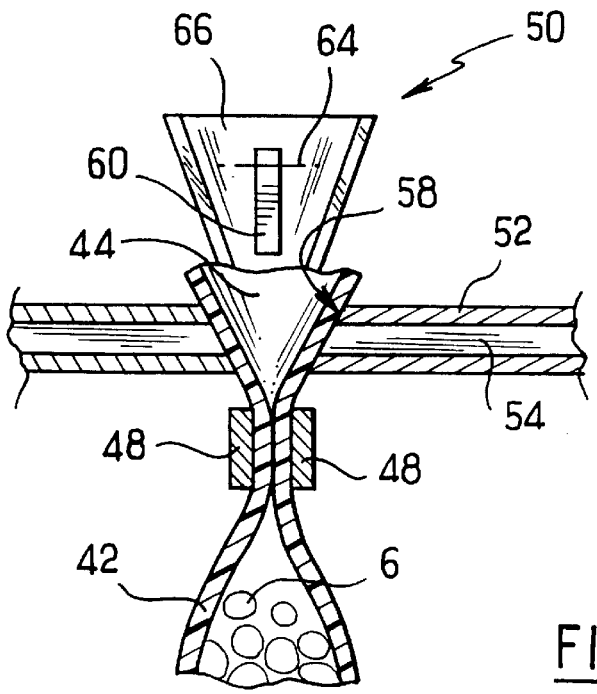

After a bag is removed downstream from the cutting area, the bag (42) arrives at a station (50) where shaping of the mouth (44) occurs. In reference to FIGS. 5 and 6, this station (50) includes two suction bars (52) that extend parallel to the direction in which the bag (42) moves and are arranged opposite to one another, in order for the two portions of the sides of the bag next to the mouth (44) to arrive at a position opposite to these bars. These bars contain internal conduits (54) that are connected to an air-intake mechanism and open into mouths on a surface (58) of the bars that is located opposite the bags. In the upstream portions of these rods (52), the two surfaces extend vertically, very close to one another, and they gradually taper outward with respect to a vertical plane, as far as an upstream portion of the bars. In this way, when the bag (42) arrives opposite said rods (52), the two sides of the bag in the vicinity of the mouth (44) are gradually separated from one another. As an alternative to these bars, or in addition to them, it would be possible to provide a suitable blower unit in order for air to be blown into the mouth (44) of the bag, so that the two sides can be forced apart.

This station (50) also includes two blades (60), each of which extends above the bag (42) at the same height and at different positions along the direction of movement. The two blades (60) are movable about two corresponding vertical axes (64). The blades are capable of moving in opposite directions from one another. The two blades are arranged to slit two side edges of the bag (42), next to the mouth (44). The edges are opposite to one another and form the junction between the two opposite sides of the bag. The two blades are arranged so as to cut the edges of the mouth as the sides are being separated by suction bars (52).

Downstream from the two blades (60), a shaping unit (66), which can have the general shape of a "V," for example, is arranged so that, after cutting, the two sides of the bag pass on either side of this shaping unit, which thus keeps them in a separated position. Although not shown in FIG. 7, the shaping unit (66) extends as far as the next station, in such a way that the bag (42) leaves the shaping unit only after a strip has been inserted into the mouth (44).

At the next station (68) in the packaging system, a continuous reclosable fastener strip (70) is inserted between the separated sides of the mouth (44) of bags (42), and this strip extends parallel to the direction in which the bags move, at a height greater than the height of the belts (30). This station contains a guide (72) through which the strip (70) passes in order to reach a convenient position. The operation that precedes the cutting of the edges of the mouth (44) by the blades (60) allows subsequent insertion of a common strip (70) into the mouth (44). After the insertion of this continuous strip, the bag (44) is released from the shaping unit (66), and the sides adjacent to the mouth (44) are pressed toward one another against the strip (70) by means of two pressing rollers (76), only one of which can be seen in FIG. 7. When the bags (42) leave this station (68), where the common strip is applied continuously, they are attached to one another by this uninterrupted common strip, as shown in FIG. 8.

In reference to FIGS. 8 and 9, the next station (80) is a station where the strip (70) is sealed to the two opposite sides of the bag (42). For this purpose, it includes two sealing rods (82) which extend opposite one another, on either side of the bags, and are suitable for sealing each surface of the strip (70) to the corresponding sides of the bag (42) as the bag moves between the two bars. Moreover, in the present example, the bars make a seal (84) of the two sides of the bag directly to one another, above the sealing strip (70). This sealing procedure provides a tamper proof seal, for example. With successive bags (42) always being connected by the common strip (70), this strip now assures that the bags are held in position with respect to each other.

Each bag (42) then arrives opposite a post-sealing or edge-sealing station (90). This station contains two sealing elements (92), which are capable of being moved away from and toward the bags (42) as they pass through it. These elements (92) are controlled so as seal the edges of the mouth (44) which have previously been slit by the blades (60). The edges are thus sealed to each other and sealed to the common strip (70). During the same operation, the edges of the bags upstream from a downstream bag are sealed and the downstream edges of a bag downstream from an upstream bag are sealed by the two sealing elements (92).

The device also includes a cutting station (94), which contains a pair of blades (96) parallel to one another and perpendicular to the direction in which the bags (42) are moving. The two blades (96) are capable of moving as a single unit in a horizontal plane, so that they can be shifted away from and toward the bags. The blades simultaneously perform a cutting of the common strip (70) just upstream from the downstream bag just downstream from the upstream bag. The blades generate a portion of the strip (70) which is separated from the two bags (42) between which it was cut. This section falls and is removed. Downstream from this location, the processes of packaging process and production of bags are completed. The belts (30) and the conveyor (40) can then travel to the ends of their paths, in order to start their return, or it is possible for bags (42) to be routed to a storage location before that point.

Of course, it is possible to make numerous modifications to the invention without departing from its scope.

It is possible to perform a sealing or gluing on the bag (42) between the placement of the cut and the substances (6), that is, close to the mouth (44), so that the mouth is sealed downstream from the position intended for the closing strip (70).

Securing of strips (70) to the bags (42) can be performed by thermal sealing, gluing, or any other equivalent means.

The strips (70) used can be the object of numerous variants. They can involve simple strips of complementary shapes, for example male and female, or else, they can consist of zipper closures. According to one variant, reclosable fastener strips can have so-called unbreakable configurations, in which the corresponding supports for the strips are connected by a band folded into a "U," and capable of being broken at the time of initial opening of a bag, in order to allow inspection of the bag, as is indicated, for example, in U.S. Pat. No. 3,991,801.

It is possible to replace the attaching of a single uninterrupted common sealing strip (70) by attaching separate individual strips on each bag (42).

In the present example, the same two belts (30) accompany the bag (42) after cutting until the packaging process is complete. As an alternative, several sets of successive belts can be used.

The entire device can be controlled in a suitable manner by means of electronic feed systems including a step-up motor, a servomotor, a feed detector, a speed sensor, etc.

It is possible for the belts in the cutting area to be replaced by other mechanisms, such as a gripping mechanism with clamps that can remove a bag when cutting is completed and place it on the transport mechanism, for example a conveyor belt, and bring it to the specified stations.

Having thus described the invention, what is claimed is:

1. A process for producing bags from a tube comprising:

cutting the tube at a bag length from a free end of said tube;

separating the cut section from the remaining tube portion;

thereafter affixing a section of reclosable fastener to the cut section, said section of reclosable fastener being affixed to an open end of said cut tube section defining a mouth opposite to said free end;

bringing opposite sides of said cut tube section together so as to define opposite walls of said bag and forming a transverse seal joining said walls at said free end prior to cutting said tube whereby to form a bag;

said separating step comprising moving said tube lengthwise to a position for cutting said cut tube section from said remaining tube portion, and, after cutting, moving said bag away from said remaining tube portion in another direction not parallel to said lengthwise locally moving direction of said tube;

said affixing step comprising spreading apart the spread apart open end of said bag so as to form a mouth of said bag; and slitting opposite side edges of said cut tube section adjacent said open end prior to affixing said section of reclosable fastener.

2. A process in accordance with claim 1 wherein a plurality of bags move in edge-to-edge direction spaced apart in-line and further comprising the step of positioning a shared length of reclosable fastener into slits formed in said slitting step at opposite edges of one bag, spanning the distance between said one bag and a bag adjacent to said one bag and extending into the slits at opposite edges of said adjacent bag.

3. A process in accordance with claim 2 comprising the further steps of securing said shared length of reclosable fastener to said one bag and said adjacent bag and thereafter cutting said shared length of reclosable fastener in the area spanning said one bag and said adjacent bag.

4. A process in accordance with claim 3 comprising the further step of joining said slits at opposite edges of each bag and the shared length of reclosable fastener prior to cutting said shared length of reclosable fastener in the area spanning said one bag and said adjacent bag.

5. A process in accordance with claim 1 comprising the step of filling said tube section after forming said transverse seal and prior to cutting said tube section from the remaining tube portion.

6. A process in accordance with claim 5 wherein said filling occurs prior to affixing said section of reclosable fastener to said cut section.

7. A system for producing bags comprising:

means for feeding a tube;

a cutting mechanism for cutting a section of tube and detaching said section from the remainder of said tube to form a bag, said cutting mechanism forming an open mouth of said tube section, said cutting mechanism including means for supporting said tube section while said tube section is being cut;

means for affixing a section of reclosable fastener to said bag after said bag is detached from the remainder of said tube, said affixing means attaching the section of reclosable fastener to the open mouth;

means for bringing opposite sides of said tube together so as to form opposite walls extending between opposite edges and for forming a transverse seal across said opposite walls from edge to edge, said aforementioned means being positioned upstream of said cutting mechanism in the direction of feeding said tube;

means for transferring said bag from said tube to said affixing means, said transferring means including a conveyor belt and moving said bag in a direction not parallel to a feed direction of said tube at said cutting mechanism, said transferring means being disposed to engage said bag when said cutting mechanism detaches said bag from the remainder of said tube so as to permit arrival of another bag at said cutting mechanism;

said means for affixing comprising means for separating said opposite walls at the end opposite to said transverse seal so as to form an open mouth into said bag; and means for slitting said opposite edges at an area adjacent said separated walls at said open mouth.

8. A system in accordance with claim 7 wherein said transferring means comprises belts extending on either side of said bag.

9. A system in accordance with claim 7 further comprising means for feeding an endless section of reclosable fastener to said bag slits when said bag is positioned on said transfer means.

10. A system in accordance with claim 9 further comprising means for cutting said endless section of reclosable fastener upstream of said means for affixing said section of reclosable fastener to said bag.

11. A system in accordance with claim 10 further comprising means for sealing said slit edges to one another and sealing said section of reclosable fastener to said bag walls.

12. A system in accordance with claim 7 further comprising means for introducing a substance into said bag upstream to affixing said section of reclosable fastener to said bag.

13. A system in accordance with claim 7 further comprising means for introducing a substance into said bag upstream of said cutting means.

* * * * *